US009038034B2

(12) United States Patent
Akenine-Moller et al.

(10) Patent No.: US 9,038,034 B2
(45) Date of Patent: May 19, 2015

(54) COMPILING FOR PROGRAMMABLE CULLING UNIT

(75) Inventors: Tomas G. Akenine-Moller, Lund (SE); Jon N. Hasselgren, Bunkeflostrand (SE); Carl J. Munkberg, Malmo (SE); Franz P. Clarberg, Lund (SE); Robert M. Toth, Lund (SE)

(73) Assignee: Intel Corporation, Santa Clara, CA (US)

( * ) Notice: Subject to any disclaimer, the term of this patent is extended or adjusted under 35 U.S.C. 154(b) by 1054 days.

(21) Appl. No.: 12/644,075

(22) Filed: Dec. 22, 2009

(65) Prior Publication Data

US 2011/0148876 A1 Jun. 23, 2011

(51) Int. Cl.
*G06F 9/45* (2006.01)
*G06T 15/40* (2011.01)

(52) U.S. Cl.
CPC .................. *G06F 8/41* (2013.01); *G06F 8/443* (2013.01); *G06T 15/40* (2013.01)

(58) Field of Classification Search
USPC .......................................................... 717/140
See application file for complete search history.

(56) References Cited

U.S. PATENT DOCUMENTS

| 6,016,398 | A * | 1/2000 | Radigan ......................... 717/152 |
| 7,145,565 | B2 * | 12/2006 | Everitt et al. .................. 345/426 |
| 7,159,212 | B2 * | 1/2007 | Schenk et al. ................. 717/153 |
| 8,269,768 | B1 * | 9/2012 | Greene et al. ................. 345/422 |
| 2004/0015531 | A1 * | 1/2004 | Walster et al. ................. 708/446 |
| 2004/0169651 | A1 * | 9/2004 | Everitt et al. .................. 345/426 |
| 2006/0098019 | A1 * | 5/2006 | Tarditi et al. .................. 345/505 |
| 2008/0074421 | A1 * | 3/2008 | Hayes ............................ 345/426 |
| 2009/0089763 | A1 * | 4/2009 | Chen et al. .................... 717/140 |
| 2009/0167763 | A1 | 7/2009 | Waechter et al. |
| 2010/0026684 | A1 | 2/2010 | Hasselgren et al. |
| 2010/0182314 | A1 * | 7/2010 | Akenine-Moller et al. .. 345/421 |
| 2011/0148876 | A1 * | 6/2011 | Akenine-Moller et al. .. 345/421 |
| 2012/0274636 | A1 * | 11/2012 | Akenine-M ller et al. ... 345/420 |

FOREIGN PATENT DOCUMENTS

WO   2006/115716   11/2006

OTHER PUBLICATIONS

"PhotoRealistic RenderMan Attributes", Copyright © 1996-2004 Pixar, retrieved from <http://staffwww.itn.liu.se/~stegu/TNM022-2004/PRMan-docs/prman_technical_rendering/users_guide/attributes.html>, total pp. 9.*

Heidrich et al., "Sampling Procedure Shaders Using Affine Arithmetic", Technical Report 1998, retrieved from <http://www.cs.ubc.ca/~heidrich/Papers/TR.11.96.pdf>, total pp. 8.*

(Continued)

*Primary Examiner* — Don Wong
*Assistant Examiner* — Marina Lee
(74) *Attorney, Agent, or Firm* — Trop, Pruner & Hu, P.C.

(57) ABSTRACT

During compilation, the interval bounds for a programmable culling unit are calculated if possible. For each variable, interval bounds are calculated during the compilation, and the bounds together with other metadata are used to generate an optimized culling program. If not possible, then an assumption may be made and the assumption used to compile the code. If the assumption proves to be invalid, a new assumption could be made and the code may be recompiled in some embodiments.

26 Claims, 8 Drawing Sheets

(56) References Cited

OTHER PUBLICATIONS

Clarberg et al., "An Optimizing Compiler for Automatic Shader Bounding", c 2010, retrieved from <http://fileadmin.cs.lth.se/graphics/research/papers/2010/oic/clarberg2010_oic.pdf> total pp. 10.*
European Patent Office, Combined Search Report and Written Opinion issued in corresponding EP Application No. 10196258.7, dated Apr. 12, 2011, 7 pgs.
Greene, N., et al., "Hierarchical Z-buffer Visibility," SIGGRAPH 1993, pp. 231-238.
Hasselgren, J., et al., "Automatic Pre-Tessellation Culling", ACM Transactions on Graphics, 2009, vol. 28, No. 2, Article 19, Apr. 2009, 10 pages.
Hasselgren, J., et al., "PCU: The Programmable Culling Unit", ACM Transactions on Graphics (Proceedings of ACM SIGGRAPH 2007, vol. 26, No. 3, 2007, 10 pages.
Morein, S., et al., "ATI Radeon HyperZ Technology," Workshop on Graphics Hardware, Hot3D Proceedings, Aug. 2000, 21 pages.
Velazquez-Armendariz, E., et al., "Automatic Bounding of Programmable Shaders for Efficient Global Illumination," ACM SIGGRAPH, 2009, 9 pages.

* cited by examiner

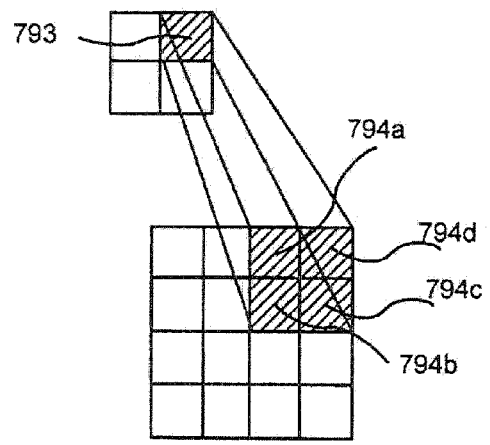 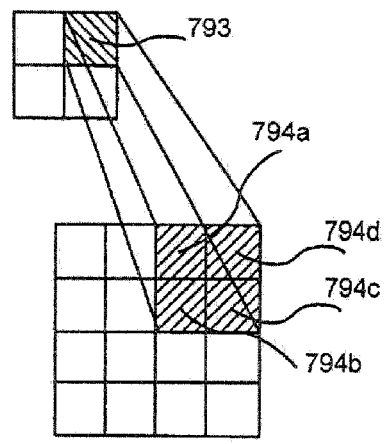
FIG. 7a     FIG. 7b
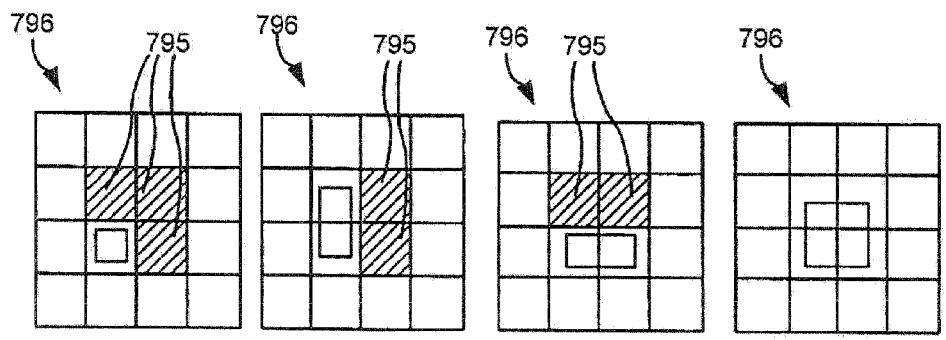
FIG. 8a     FIG. 8b     FIG. 8c     FIG. 8d

COMPILING FOR PROGRAMMABLE CULLING UNIT

BACKGROUND

The present invention generally relates to digitally represented graphics and more particularly to improving the performance of generating digitally represented graphics.

In the 1980's and 1990's, display adapters for computers and game consoles appeared with graphics accelerators, offloading the Central Processing Unit (CPU) in graphics generation. Initially, the display adapters offered acceleration of 2D graphics, but eventually they also included support for accelerated 3D graphics. Modern display adapters use a processing unit often named a graphics processing unit (GPU).

Due to the complexity of 3D graphics, GPU's use a significant amount of their processing power to perform calculations related to 3D graphics. There are always new applications and games requiring higher frame rates (rendered screen images per second), higher resolutions and higher image quality, resulting in requirements that each screen image should be rendered in as short a time as possible. In other words, it is always important to increase performance.

Performance may be increased by increasing the processing power of the GPU's by enabling higher clock speeds, pipelining, or exploiting parallel computations. However, this often generates more heat, resulting in more power consumption and higher fan noise for cooling the GPU. Moreover, there are limits to the clock speeds of each GPU.

BRIEF DESCRIPTION OF THE DRAWINGS

FIG. 6b is a graph illustrating input values in the case of FIG. 6a.

FIGS. 7a and 7b are illustrative perspective views of textures which can be used in the display adapter of FIG. 1.

FIGS. 8a-d are illustratory views of textures which can be used in the display adapter of FIG. 1.

DETAILED DESCRIPTION

Figure 1:
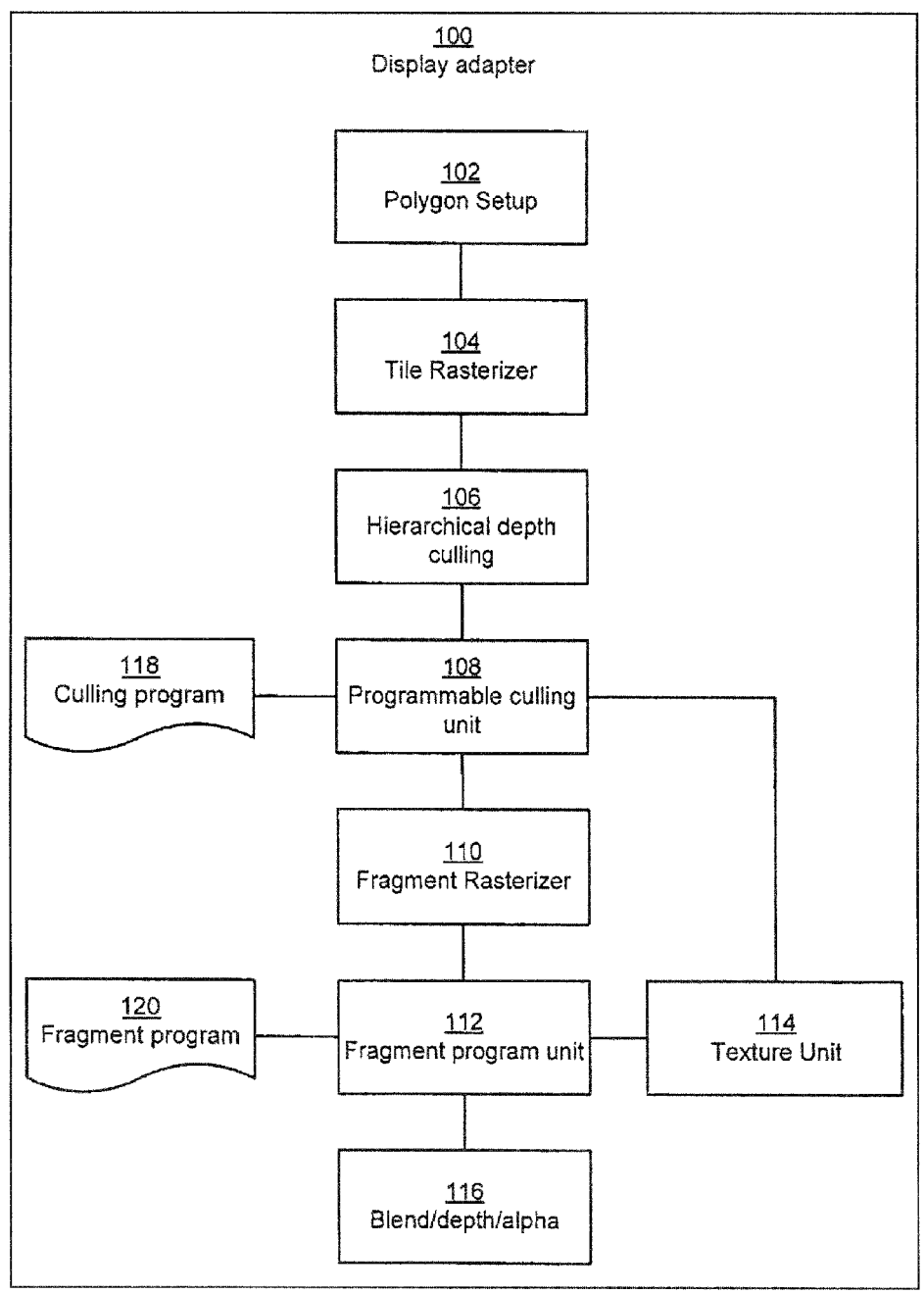
FIG. 1 is a block diagram illustrating how different entities interact in a display adapter in an embodiment of the present invention.
Figure 5:
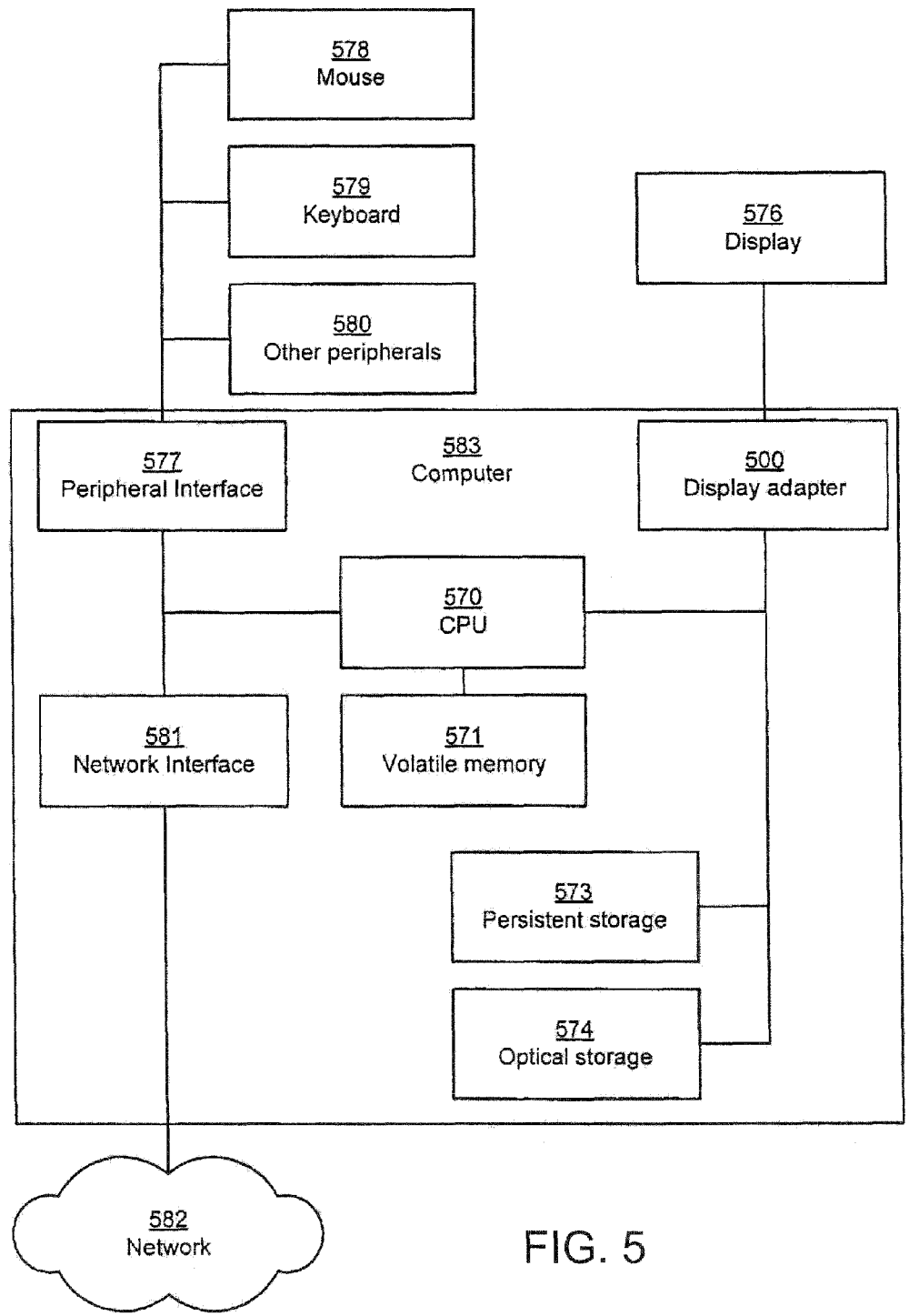
FIG. 5 shows an overview architecture of a typical general purpose computer embodying the display adapter of FIG. 1.

Referring to FIG. 1, a display adapter 100 may include a polygon setup block 102 that is responsible for setting up polygons as instructed by a connected central processing unit (CPU) 570, shown in FIG. 5. Although any polygon can be used, triangles are commonly used. For each polygon, a tile rasterizer 104 divides the polygon to be rendered into one or more tiles, where each tile is at least partly overlapped by the polygon. In general, a tile is a group of fragments. In one embodiment, a tile is a two-dimensional rectangle containing a number of fragments. Each of these fragments corresponds to a pixel and contains all data required to render the pixel and to test whether the pixel should be rendered on the screen. A common size of a tile is 8 by 8 fragments, although any tile size is within the scope of the invention.

A hierarchical depth culling block 106 performs hierarchical depth culling, which is culling based on depth buffering. Here, a conservative test may be performed to prove whether that tile is covered by the contents in the depth buffer. In other words, the test determines if there is another rendered object fully covering the polygon in the tile, from the viewer's perspective. If that is the case, the entire tile can be culled, i.e. singled out for less processing, e.g. skipped. This then may result in performance gains in some embodiments. The hierarchical depth culling may be performed either before or after the culling of a programmable culling unit 108. This unit may be a fixed function, which means that it does not execute a replaceable program in one embodiment.

In the programmable culling unit 108, culling is performed according to a replaceable culling program 118, also known as a replaceable culling module. The details of this culling program 118 and the effects are explained in more detail in conjunction with FIG. 4a below.

In a fragment rasterizer 110, the tile processed by the programmable culling unit 108 is broken down into fragments, overlapping the polygon. Each of these fragments corresponds to a pixel and contains data to render the pixel and to test whether the pixel should be rendered on the screen. The fragment data may include raster position, depth, color, texture coordinates, stencil, alpha (used for blending), etc. For every pixel there may exist a plurality of fragment samples.

In the fragment program unit 112, the fragments output from the fragment rasterizer are processed using a fragment program 120. The purpose of this unit is to perform tasks such as combining previously evaluated color with textures, as well as to add effects such as fog, as well as to, when possible, identify fragments that do not need to be rendered, i.e. fragment culling.

A texture unit 114 is used for texture lookups, for example using one-dimensional, two-dimensional, three-dimensional, four-dimensional and cube map textures, and provides these to the programmable culling unit 108 and the fragment program unit 112.

The blend/depth/alpha unit 116 uses the fragments provided from the fragment program unit 112 to perform depth testing, alpha testing, and blending before the fragments are written to target buffers.

Figure 2:
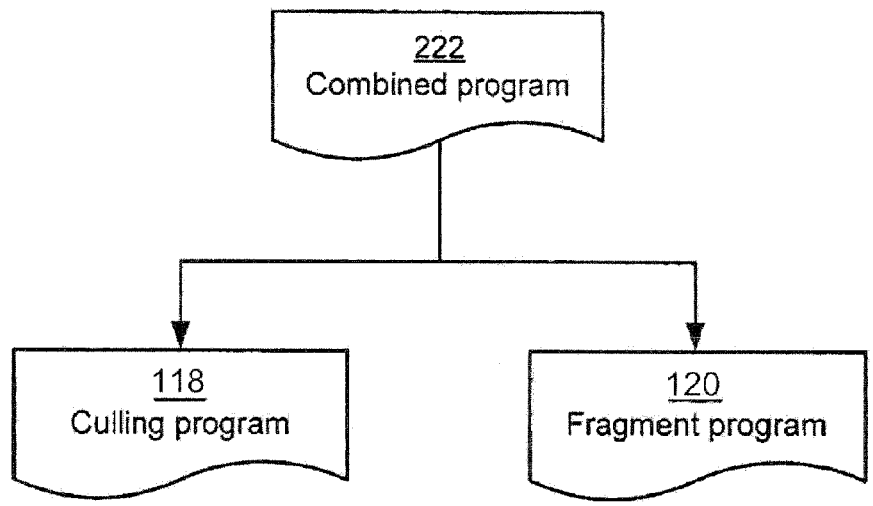
FIG. 2 is a schematic block diagram showing the relationships between different programs used in the display adapter of FIG. 1.

A combined program or compiler program 222, shown in FIG. 2, can be used to automatically generate a culling program 118 for use in the programmable culling unit 108 and a fragment program 120 for use in the fragment program unit 112. Optionally, a programmer can write individual culling and fragment programs 118, 120.

As an example, consider the pseudo code segment (1) of a combined program 222, originally written for use as a fragment program:

$DP3 d,n,I$ $KIL d<0$ $TEX2D c,t0,r1$ $MUL out.col,d,c$     (1)

This program performs basic diffuse lighting by computing the dot product between the light (I) and normal (n) vectors into a result (d) using the DP3 instruction. The n and I vectors varies per fragment. The KIL instruction terminates all fragments where the surface normal does not face the light, indicated by d being less than 0. The TEX2D instruction performs a lookup of a two dimensional texture into c. Finally, the result (d) is multiplied by a diffuse material coefficient (c).

The KIL instruction is an opportunity for culling a whole tile of fragments. But in order to do so, it should be conservatively proven that the condition for the KIL instruction is fulfilled for the whole tile. In this example, it must also be possible to conservatively evaluate the DP3 instruction, since the KIL instruction depends on the result of that instruction. Furthermore, it must be possible to find conservative bounds of the input (the vectors for the normal n and light I in this case) for a whole tile, since the DP3 instruction in turn depends on these values.

In order to implement this chain of conservative evaluations, the programmable culling unit is based on the same instruction set as the fragment program unit. However, instead of floating-point variables as source and destination registers to an instruction, as is typical when processing fragments, intervals are used and the instruction is implemented using principles of interval arithmetic. As a simple example, consider a standard ADD instruction:

$$\text{ADD } c,a,b \Leftrightarrow =a+b \quad (2)$$

For the corresponding programmable culling unit interval instruction, the operands are replaced by intervals, $\hat{a},\hat{b},\hat{c}$ where an interval, e.g. $\hat{a}$, is defined as:

$$\hat{a}=[\underline{a},\overline{a}]=\{x|\underline{a}\leq x\leq \overline{a}\} \quad (3)$$

The programmable culling unit ADD instruction is then:

$$\text{ADD } \hat{c},\hat{a},\hat{b} \Leftrightarrow \hat{c}=\hat{a}+\hat{b} \quad (4)$$

where the interval addition operation is implemented as:

$$\hat{a}+\hat{b}=[\underline{a},\overline{a}]+[\underline{b},\overline{b}]=[\underline{a}+\underline{b},\overline{a}+\overline{b}] \quad (5)$$

As can be seen, the result of the interval addition contains all possible results of "normal" additions, or more formally, it holds that $a+b \in \hat{a}+\hat{b}$ given that $a \in \hat{a}$ and $b \in \hat{b}$. It is therefore conservatively correct. In similar fashion, the behavior of every instruction in the fragment program instruction set is redefined.

In addition to using interval instructions, the input may also be defined as intervals. Therefore, it must be possible to compute conservative bounds for quantities interpolated over an entire tile of fragments. It is to be noted that although interval arithmetic is used herein, any suitable arithmetic representing the whole tile can be used. For example, affine arithmetic or Taylor arithmetic can equally well be used within the scope of the present invention.

With the reasoning above, the culling program 118 can be automatically derived from the combined program (1). The derived culling program is:

$$DP3\,\hat{d},\hat{n},\hat{I}$$

$$KIL\,\hat{d}<0 \quad (6)$$

Furthermore, here the fragment program 120 is derived from the combined program (1), to be identical to the combined program 220. The fragment program is:

$$DP3\,d,n,I$$

$$KIL\,d<0$$

$$TEX2D\,c,t0,r1$$

$$MUL\,\text{out.col},d,c \quad (7)$$

Figure 3:
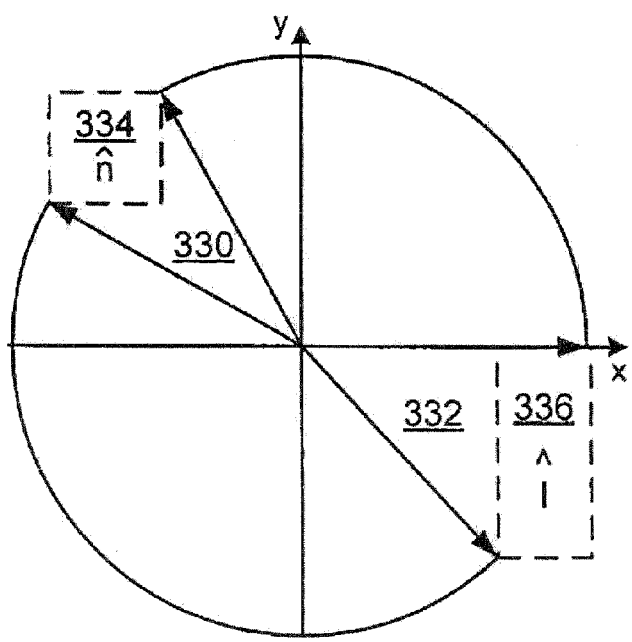
FIG. 3 illustrates an example of where interval arithmetic can be used to cull a tile in the display adapter of FIG. 1.

For an entire tile of fragments, assume that it is determined that the input interval 334 of its normals 330 is $\hat{n}=([-\sqrt{3}/2,-1/2],[1/2,\sqrt{3}/2])$, and the interval 336 for its light vector 332 is $\hat{I}=([1/\sqrt{2},1],[-1/\sqrt{2},0])$, as illustrated in FIG. 3. The z-coordinates are assumed to be zero, which simplifies this example. The dot product between these interval representations results in $\hat{d}=\hat{n}\cdot\hat{I}=[-(\sqrt{6}+\sqrt{3})/\sqrt{8},-1/\sqrt{8}]$. It can thus be concluded that $\hat{d}$ can be at most be $\overline{d}=-1/\sqrt{8}$. Since this value is strictly less than zero, in the culling program explained above with reference to FIG. 2, this whole tile can be culled without executing the fragment program for every fragment, as will be explained in some further detail with reference to FIG. 4a below. This is a source of a performance gain in some embodiments of the present invention.

Figure 4A:
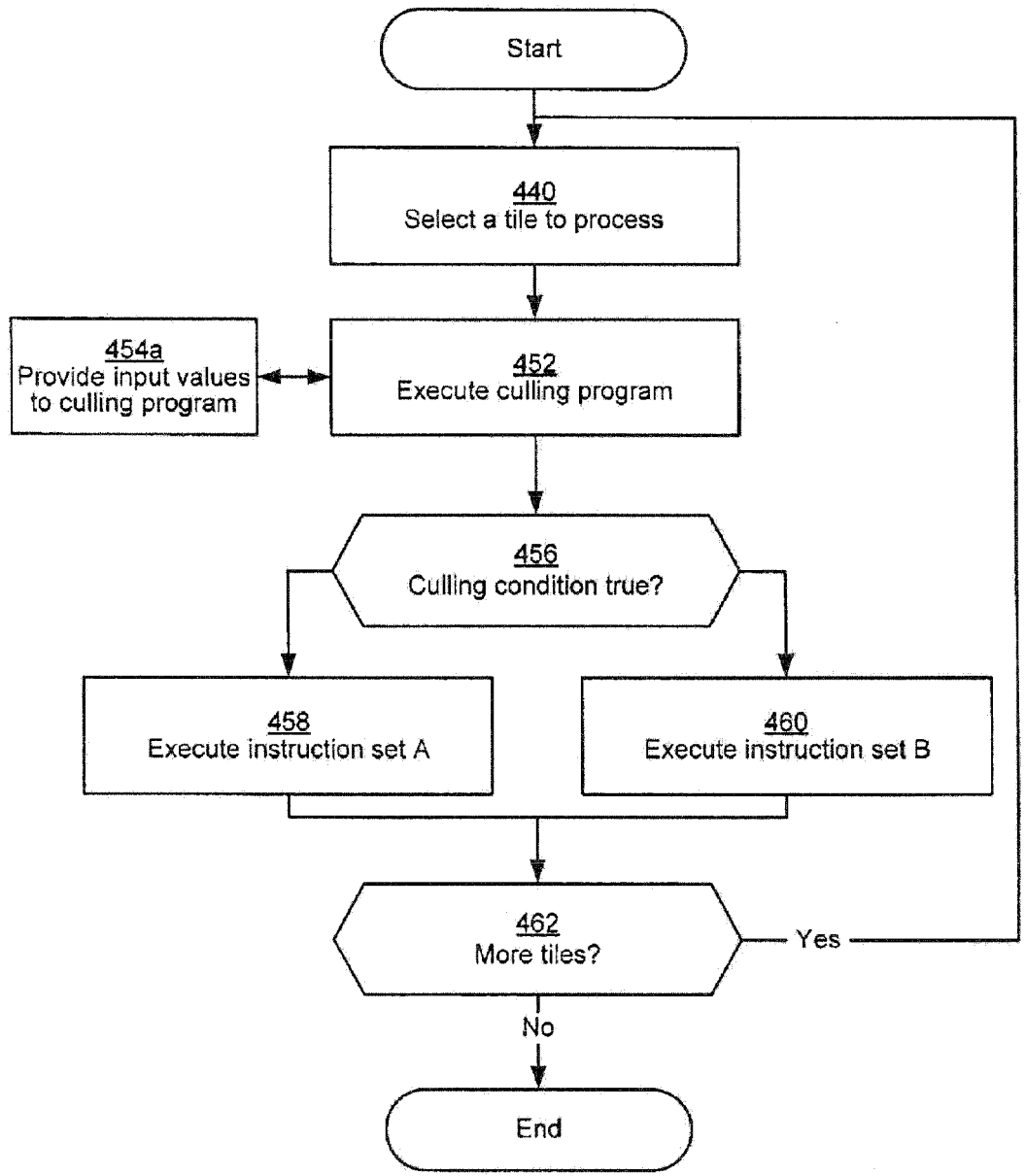
FIGS. 4a and 4b show flow charts for culling processes that can be executed in the display adapter of FIG. 1.

FIG. 4a shows a flow chart for a culling process that can be executed in the display adapter 100 of FIG. 1. When this process starts, a polygon has been selected to be rendered. In a select a tile to process step 440, a tile is selected, where the selected tile is at least partly overlapped by the polygon. The culling program is then executed in the execute culling program step 452.

In this embodiment, when the culling program requests input values, the process continues to provide input values to culling program step 454a. The input values are values relating to a characteristic representing all fragments in the tile in some manner. For example, input values could be normals, position coordinates, light vectors, colors, texture coordinates, etc. The requested input values are calculated, in this embodiment, using interval arithmetic. In other words, the input values are only calculated when they are needed, according to a 'pull' mechanism, in contrast to the 'push' mechanism explained with reference to FIG. 4b. The result of the culling program is whether the currently processed tile should be culled or not. This can be determined strictly, whereby the tile is culled only if the current polygon makes no contribution to the finally rendered image, in the region of the tile. Alternatively, lossy culling can be performed, whereby the tile is culled if a contribution of the current polygon to the finally rendered image falls below a certain threshold value, in the region of the tile.

When the culling program has finished processing, the process continues to a conditional culling condition true step 456. In this step, it is determined whether the culling should be performed for the currently processed tile or not according to the output of the culling program. If culling is to be performed, the process continues to an execute instruction set A step 458. Otherwise, the process continues to an execute instruction set B step 460. In one embodiment, if the culling condition is false, the tile is broken into several smaller tiles and the process returns to the select tile to process step 440. This can be repeated successively for smaller and smaller tiles, implementing a hierarchical, multilevel culling process.

The culling program may also output results other than a culling condition. These results may be sent down the graphics pipeline for further processing. An example of such an embodiment would comprise reversing the order of the hierarchical depth culling unit 106 (FIG. 1) and the programmable culling unit 108 (FIG. 1). The programmable culling unit computes a bounds or interval of the depth values in a tile, and this interval is sent to the hierarchical depth culling unit. The hierarchical depth culling unit then performs culling based on depth values that are computed by a program.

In the execute instruction set A step 458, an instruction set A is performed for a subset of the tile, typically fragments. The fragments typically collectively cover all pixels of the tile, that overlaps the triangle being processed.

In the execute instruction set B step 460, an instruction set B is performed for a subset of the tile, typically fragments. This is typically a conventional processing of rendering of the fragments after the tile stage.

The instruction set A is typically less demanding than the instruction set B, resulting in a reduced number of instructions processed for the tile when the culling condition is determined to be true, resulting in increased performance. In one embodiment, the instruction set A is empty, leading to a considerable reduction in processing, i.e. increased performance. The flow continues to integrate until there are no more tiles at step 462.

Figure 4B:
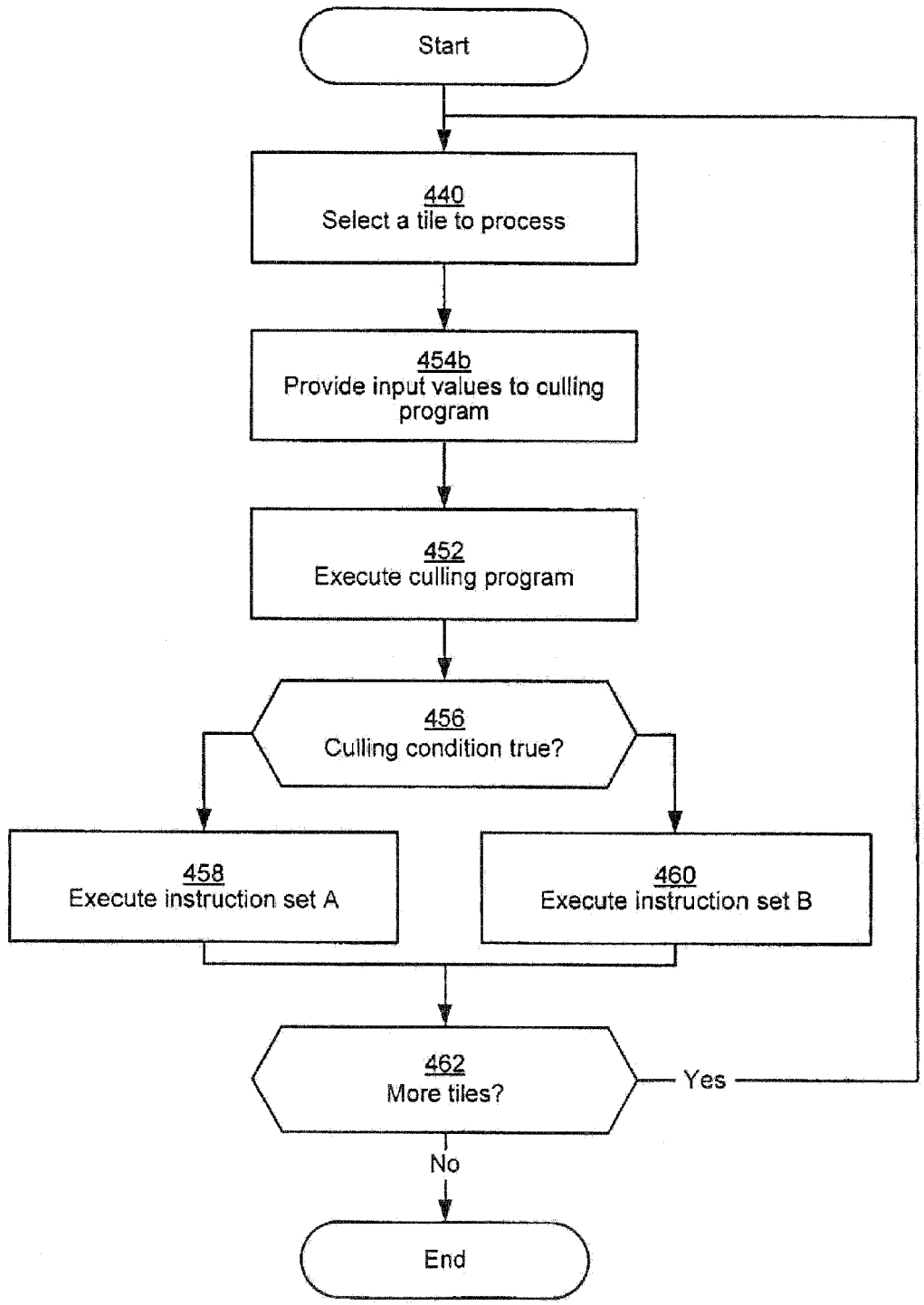

FIG. 4b shows a process essentially equal to the process described with reference to FIG. 4a. The select a tile to process step 440, the execute culling program step 452, the conditional culling condition true step 456, the execute instruction set A step 458, the execute instruction set B step 460 and the conditional more tiles step 462 are all equal to the corresponding steps of FIG. 4a.

However, the provide input values to culling program step 454b is processed here before the culling program is executed. In this step, all relevant input values are calculated, in this embodiment using interval arithmetic, and provided so that the culling program can access these values. This implements a 'push' mechanism for the input value calculation.

FIG. 5 shows an overview architecture of a typical general purpose computer 583 embodying the display adapter 100 of FIG. 1. The computer has a controller 570, such as a CPU, capable of executing software instructions. The controller 570 is connected to a volatile memory 571, such as a dynamic random access memory (RAM) and a display adapter 500, which may be the same as the display adapter 100 of FIG. 1 in some embodiments. The display adapter 500 is in turn connected to a display 576, such as a monitor. The controller 570 is also connected to persistent storage 573, such as a hard drive or flash memory and optical storage 574, such as reader and/or writer of optical media such as CD, DVD, HD-DVD or Blu-ray. A network interface 581 is also connected to the controller 570 for providing access to a network 582, such as a local area network, a wide area network (e.g. the Internet), a wireless local area network or wireless metropolitan area network. Through a peripheral interface 577, the CPU 570 can communicate with a mouse 578, a keyboard 579 or any other peripheral 580, including a joystick, a printer, a scanner, etc.

It is to be noted that although a general purpose computer is described above to embody the invention, the invention can equally well be embodied in any environment where digital graphics, and in particular 3D graphics, is utilized, e.g. game consoles, mobile phones, mobile Internet devices (MIDs), MP3 players, etc. Any computer architecture may be used.

Input values may be calculated using interval arithmetic, in one implementation of the instruction set as described above. A culling program can then be executed for a whole tile of fragments. However, in order to do so, bounding intervals for the varying (or interpolated) inputs also need to be computed.

Initially, the value of the varying attribute is computed in all four corners of the tile using interpolation. Then the bounding interval of these four values is computed, and it is called $\hat{a}_c = [\underline{a}_c, \overline{a}_c]$. The bounding interval of the varying attribute at the triangle vertices are also computed, and called $\hat{a}_{tri} = [\underline{a}_{tri}, \overline{a}_{tri}]$. The final bounding interval of the varying attribute over the tile can be computed as $\hat{a}_{tile} = [\max(\underline{a}_{tri}, \underline{a}_c), \min(\overline{a}_{tri}, \overline{a}_c)]$. There are other ways to compute the intervals, e.g. by considering all fragments overlapping a tile.

Figure 6A:
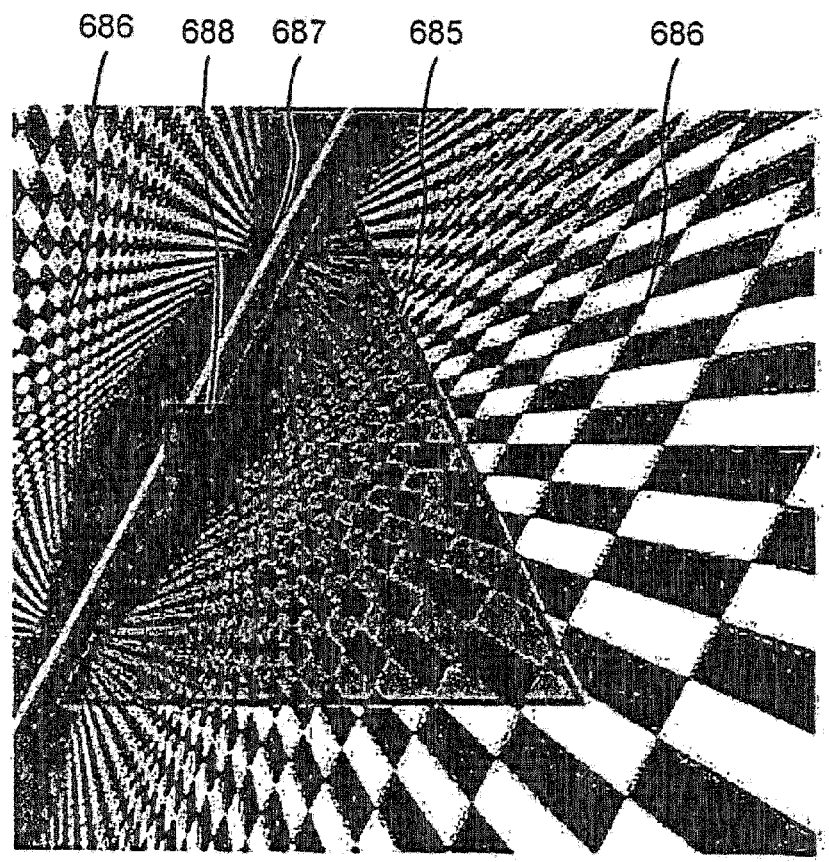
FIG. 6a is a display view illustrating an exceptional case of input values in the display adapter of FIG. 1.

Finally, an exceptional case may be dealt with, which is illustrated in FIG. 6a. Here, perspective correct interpolation over a triangle 685 is illustrated in form of a checkerboard texture 686. As can be seen, the texture is mirrored about a projection line 687, which is the line where the horizon of the triangle 685 would project if it was infinitely large. This mirroring effect is a form of back-projection caused by the division used in perspective correct interpolation. Now, assume that the bounding interval of some varying attribute is desired to be computed over a tile 688, which overlaps the projection line.

Figure 6B:
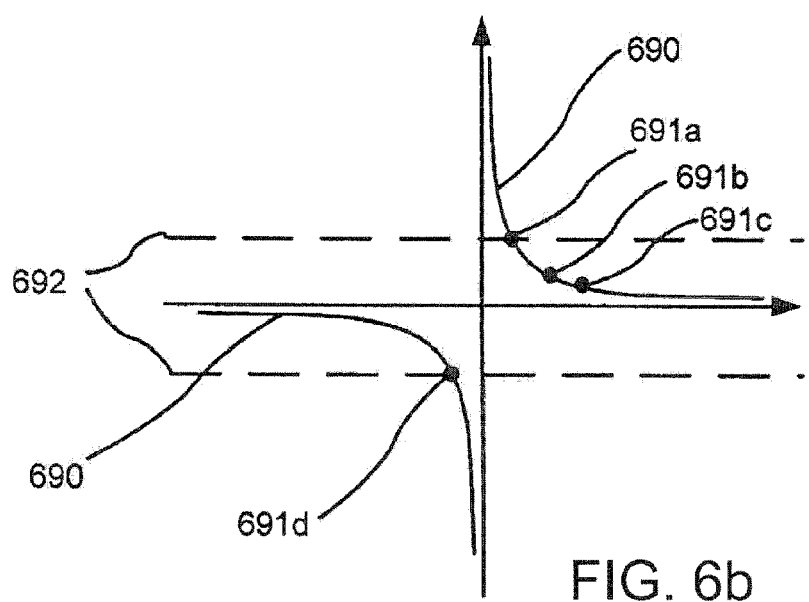

FIG. 6b shows the perspective correct interpolation function 690, as well as the values 691 a-d acquired when the four corners of the tile 688 are interpolated. The bounding interval 692 of these corners is clearly incorrect since this does not contain all of the values of the function 690 in this interval, as this function approaches infinity at the projection line.

This exceptional case may be dealt with by setting $\hat{a}_{tile}$ to $\hat{a}_{tri}$ as the bounding interval for tiles overlapping the projection line. In this embodiment, only tiles actually overlapping the triangle are traversed, and perspectively correct barycentric coordinates are used to do the interpolation.

The problematic tiles can easily be detected when computing perspectively correct barycentric coordinates for the corners of a tile. The perspectively correct barycentric coordinates are expressed as a rational function, and if the denominator is less than zero for any of the tile corners then the tile crosses the projection line.

N-dimensional texture lookups are performed as follows. The general idea is to provide a fast and efficient means of computing the bounding interval of the texture data over a given area. The remainder of this example will only consider two-dimensional textures, but generalization is straightforward.

We initially compute two mipmap pyramids for each texture that is subject to interval-based texture lookup. As shown in FIGS. 7a and 7b, each element, e.g. element 793 in a mipmap is computed as the component-wise minimum, as shown in FIG. 7a, or maximum, as shown in FIG. 7b, value of the four corresponding texels, e.g. elements 794a-d, immediately under it in the pyramid. The final result can be seen as a mipmap pyramid of bounding intervals. This type of pre-computation can easily be handled by the driver, similarly to how standard mipmaps are auto-generated.

When performing a texture lookup, we wish to compute the bounding interval of the texture data over an axis-aligned bounding box, which is the texture coordinate interval. First, we compute an appropriate mipmap level as:

$$\lceil \log_2(\max(\overline{t}_x - \underline{t}_x, \overline{t}_y - \underline{t}_y)) \rceil$$

where $\hat{t} = (\hat{t}_x, \hat{t}_y)t$ is a two-dimensional interval of the unnormalized integer texture coordinates (i.e., they include the dimensions of the texture). These are appropriately rounded such that $\underline{t}_i$ is floored and $\overline{t}_i$ is ceiled for $i \in \{x, y\}$.

When transformed to this mipmap level, t will never be more than one texel wide in any dimension, and will be at least ½ texels wide in the widest dimension. Thus, we get four possible cases of texture coordinate intervals as illustrated in FIGS. 8a-d. We always sample a square of 2×2 texels from the texels 796 with the lower left corner at the texel of $(\underline{t}_x, \underline{t}_y)$, in the access scheme used for normal linear interpolation. The result of the texture lookup is then computed as the bounds of the colors of the texels that actually overlap the texture coordinate interval. That is, we discard the texels shaded indicated by reference 795 FIGS. 8a-c. Since the mipmap transformed t will be rounded to the nearest integer coordinates, this overlap test can be implemented very efficiently by comparing just the final bit. The texture lookup process is essentially as costly as a normal "trilinearly" filtered texture lookup. The biggest differences is the need to sample from the same level in two different mipmap pyramids rather than two adjacent levels, and that we compute the final result as a bounds rather than using linear interpolation. This strategy natively supports different kinds of wrapping modes, such as clamp, repeat and mirrored repeat. The appropriate wrapping mode can simply be applied to the interval coordinates, after mipmap level computation, to get the expected result.

Only the mipmap levels that are actually used in the culling program may be created, in one embodiment. This optimization is particularly important for algorithms taking place in screen space such as, for instance, order independent transparency. In this case we know beforehand that we only need the texture at its base level, and the mipmap level that corresponds to a tile on the screen. The minimum and maximum depth values can for instance be found in the hierarchical depth culling unit. It is also possible (but less likely) that the min and max colors are already computed for compression purposes, otherwise we need to compute them.

The min/max mipmap pyramid is computed for the cube map, using the same approach as for two-dimensional textures. For the edges, the mipmap color is computed as the min or max of four texels on both sides of the edge, and for the corners the mipmap color is coupled as the min or max of four texels on all three sides emanating from that corner. Texels on opposite sides of edges will therefore share the same colors in higher mipmap levels. Similarly, the three texels in a corner will also share a common color.

This mipmap pyramid may be used to do conservative cube map lookups with accesses to only one side of the cube. First, compute the interval based equivalent of the major axis. Given a texture coordinate interval $\hat{t}=(\hat{t}_x,\hat{t}_y,\hat{t}_z)$, define the major axis, i, as the axis where $\underline{t}_i$ and $\overline{t}_i$ have the same sign, and where $\min(|\underline{t}_i|,|\overline{t}_i|)$ is maximized. If $\underline{t}_i$ and $\overline{t}_i$ have different signs over all axes, then a major axis cannot be found. However, this can only happen if the origin lies within the texture coordinate interval. In this case, the texture coordinate interval will project onto the entire cube map. This may be handled by choosing the highest mipmap level, and sample an arbitrary cube map face.

Once a major axis is found, the texture coordinate interval may be projected on the corresponding side of the cube map. The projection is done by projecting the bounds of each of the two remaining axes separately. Let us consider an example where x is the major axis and y is the axis for which we want to project the bounds. There are then six possible cases of texture coordinate intervals (note that no interval may cross the y-axis since the x-axis would not be a major axis in that case), and the extreme points we have to project to compute the bounds. It is sufficient to look at the signs of the texture coordinate interval, and through a table lookup get the extreme points.

The extreme points are projected for the remaining two axes to form a two-dimensional projected coordinate interval. This interval is used to compute a mipmap level and perform a two-dimensional texture lookup, identically to the method described in for the two-dimensional case above.

For improved performance, it is desirable to reduce the amount of work done in the cull shader and to increase the tightness of the computed bounds. In general, metadata about the interval instructions is used to generate optimized scalar instructions. The metadata can be interval bounds or even information about which side of the bounds is required, or higher level information about what operation is to be performed. For example, information about whether a square is to be done, instead of multiplication, can be an example of the type of metadata that can be used to generate optimized scalar instructions. Then the bounds may be tracked through the code at compile time to compute bounds for each variable and for each instruction. These bounds make it possible to make the code more efficient.

Figure 9:
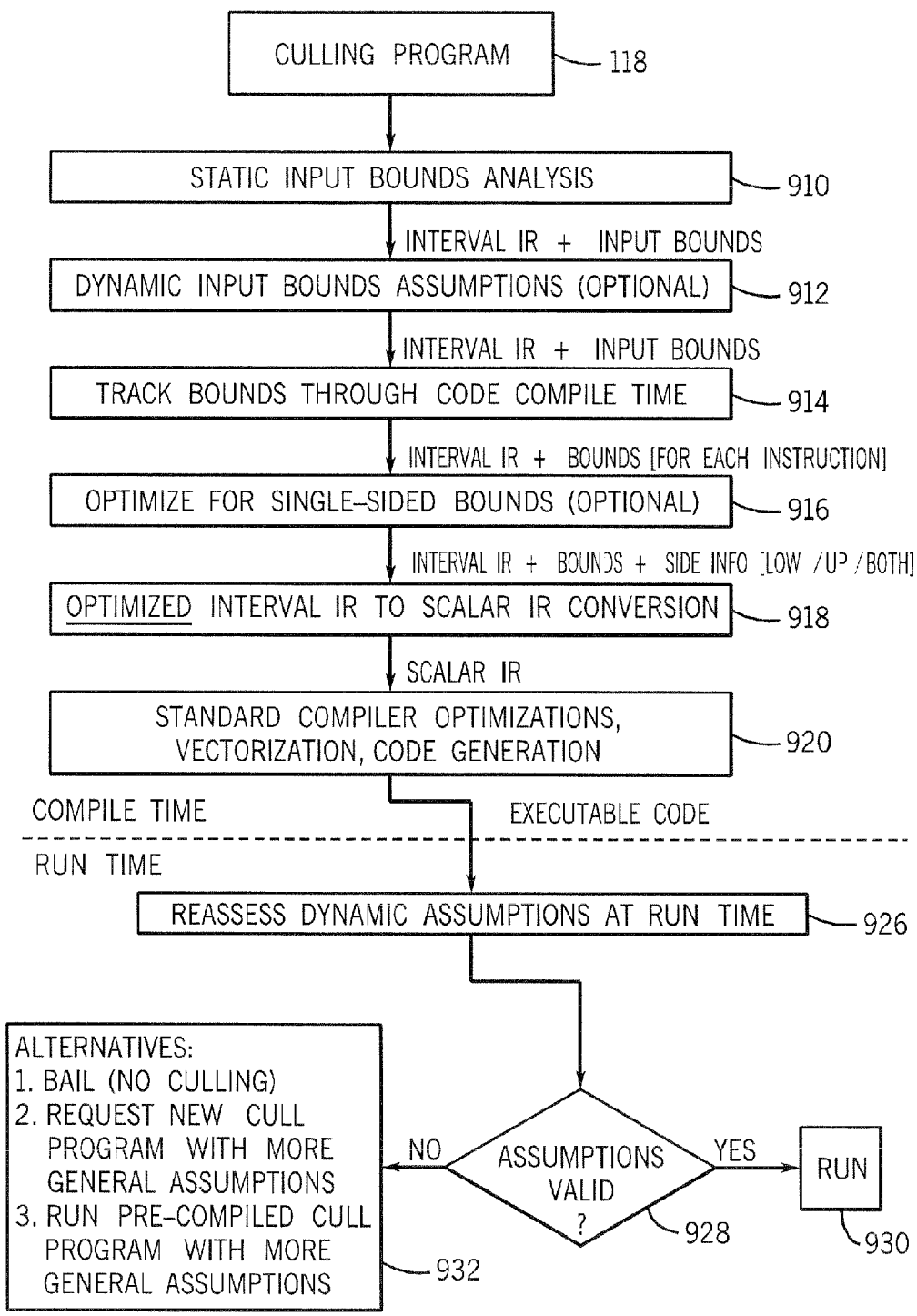
FIG. 9 is a flow chart for one embodiment.

Thus, the culling program 118 is received and is subjected to static input bounds analysis at block 910 in FIG. 9. The bounds may be based on application programming interface standards in one embodiment.

An example of such standards includes expected values for certain kinds of inputs. The bounds may also be based on constants, variable types, and data types. For example, variable types may be an unsigned integer that is positive. A data type may be a value that must be in the range between zero and one. These bounds are known to be correct. If such bounds are non-existent, then the bound may be plus and minus infinity.

These bounds may be used as inputs to evaluate the cull program in interval fashion at compile time to determine possible bounds for each variable. Known mathematical results may be applied in order to narrow compile time bounds. Examples include the fact that absolute values are always positive, sines and cosines are in the range between −1 and 1, clamp operations limit the range of possible values. Thus, the code can be executed at compile time within interval ranges. The result is a range of valid values for each instruction in the culling program.

The gathered intervals may then be used at a low level to generate more efficient interval arithmic evaluation code, which may improve run time performance in some embodiments. For example, knowing that the two operands in an interval multiplication are non-negative reduces the cost of run time interval evaluation from ten instructions to only two. Thus, this compile time analysis can reduce the length of the culling program and improve performance. Static input bounds analysis provides an interval intermediate representation, together with input bounds.

Even if non-infinite bounds cannot be determined and the default bounds of plus and minus infinity are used, there may still be a benefit in tracking the "infinite" bounds. In practice, a culling program has one or more inputs. For all or some of these inputs, stricter bounds may be determined in some cases. For example, consider y=sin(x), where x is an input to the culling program. If no bound other than x between plus and minus infinity is used, it may still be useful to track this bound through the code. For example, the output of sin(x) is always bounded by the range [−1,1]. This range may then be tracked to simplify other operations in the program.

The dynamic input bounds assumptions in block 912 may be used in some embodiments. They involve the use of assumptions based on domain specific knowledge to improve performance. For example, a domain specific knowledge may include the fact that a texture is usually in the range of zero to one. Dynamic assumptions can be made to further refine static bounds.

As an example, the result of a texture read may generally be entirely unknown at compile time. However, it is reasonable to make the assumption that the value will be within the zero and one range, as most textures are stored as unsigned normalized values. The shader compiler can automatically make that reasonable assumption based on the input format and use this information to generate faster culling programs in some embodiments. The faster code path will be valid so long as the inputs actually do fall within the assumed range.

However, if a floating point surface, for example, is bound to the shader, the zero to one range assumption may be violated. At run time, the shader execution mechanism will be aware of the erroneous assumption and may request a corrected culling shader. This may, if desired, be done asynchronously by skipping culling for that particular shader until the corrected version is available. Degradation can be done in several steps. In the case of textures, most images contain only non-negative values, even if the representations, such as floating point, can represent negative values. Violating the zero to one range can mean that the data is at least bounded by zero and infinity, which stills gives performance advantages over entirely unknown data.

The output from the dynamic input bounds assumption is, again, the interval intermediate representation plus the input bounds as supplemented, in some embodiments, by the dynamic input bounds assumptions.

In block 914, the bounds are tracked through the code at compile time to compute bounds for each variable. These bounds make it possible to generate more efficient code. The code is executed at compile time and each instruction is analyzed to determine its range of possible inputs and outputs. This process starts at the beginning with the static dynamic input bounds and propagates forward.

The output of block 914 is the interval intermediate representation and bounds for each instruction. In block 916, an optimization may be done for single sided bounds in some embodiments. In some cases, only the upper or lower bound of a result is needed. Instructions may be tagged to generate an output as single sided. This single sided tag may propagate information backwards to the extent possible.

The output of block 916 is the interval intermediate representation, the bounds, and the side information, either low, up, or both low and up.

Then, in block 918, the interval intermediate representation is converted to an optimized scalar intermediate representation. The bounds information and the side information may be used to replace each interval instruction with an optimized sequence of scalar instructions. Thus, instead of naively replacing each internal instruction by a general sequence of scalar instructions, bounds may be used to confine the extent supported by the scalar instructions. For example, if the input ranges of an interval multiplication are known to be strictly non-negative, the instruction may be replaced by a shorter sequence of scalar instructions, which has been optimized to only work on non-negative numbers.

Finally, in block 920, the scalar intermediate representation is used for standard compiler optimizations, such as dead code elimination, vectorization, and code generation. The executable code is output after block 920, and the flow transitions from compile time to run time.

At run time, the dynamic assumptions may be reassessed, as indicated in block 926. If the assumptions are valid, as determined in 928, the cull program may be run, as indicated in block 930.

Otherwise, various alternatives may be considered. For example, it may be decided that no culling can be done. Alternatively, a new cull program may be requested with more general assumptions. As still another alternative, a pre-compiled cull program with more general assumptions may be run, all as indicated in block 932. If several precompiled programs exist, the one with the most restrictive input assumptions that satisfy the current assumptions may be chosen.

In some embodiments, other bounded arithmetics, such as affine arithmetic or Taylor arithmetic, may be used. In these cases, the input/output bounds may be replaced by higher-dimensional representations suitable for the chosen arithmetic.

In some embodiments, the sequence depicted in FIG. 9 may be implemented in software. In such case, the sequence may be embodied in instructions stored on a computer readable medium. That medium may be, for example, a semiconductor, optical, or magnetic storage. The instructions are executed by a computer including a controller or processor. For example, the controller and processor may be the CPU 570 in FIG. 5 or part of the display adapter 500. The storage that stores the instructions may, for example, be the memory 571 or storage 573 or 574.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor. References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining, before run time, whether a code for a programmable culling unit has at least one culling input variable with non-infinite bounds that can be determined;
   if so, for each variable whose bounds can be determined, tracking the bounds at compile time through the code;
   wherein if the bounds cannot be determined at compile time, making an assumption at compile time of the bounds; and
   wherein tracking the bounds including evaluating instructions using bounded arithmetic.

2. The method of claim 1 including using information about interval instructions to generate scalar instructions, said interval instructions having operands spaced by intervals.

3. The method of claim 2 wherein using information includes using tracked interval bounds.

4. The method of claim 1 including reassessing the assumption at run time.

5. The method of claim 4 wherein if the assumption is determined to be valid, running the code.

6. The method of claim 4 including if the assumption is determined not to be valid, making a new assumption and compiling the code with the new assumption.

7. The method of claim 6 wherein if the new assumption does not work, compiling the code without using bounds.

8. The method of claim 1 including simplifying one or more bounds to single sided bounds.

9. The method of claim 1 wherein evaluating instructions using bounded arithmetic includes using one of interval arithmetic, affine arithmetic, or Taylor arithmetic.

10. A non-transitory computer readable medium storing instructions executed by a computer to:

determine during compilation whether code for a programmable culling unit has at least one culling input variable with non-infinite bounds that can be calculated;

if so, for each variable whose bounds can be determined, tracking the bounds through the code during compilation;

make an assumption at compile time of the bounds if the bounds cannot be calculated at compile time; and track the bounds including evaluating instructions using bounded arithmetic.

11. The medium of claim 10 further storing instructions to use information about interval instructions to generate scalar instructions, said interval instructions having operands spaced by intervals.

12. The medium of claim 11 further storing instructions to use tracked interval bounds as said information.

13. The medium of claim 10 further storing instructions to reassess the assumption at run time.

14. The medium of claim 13 further storing instructions to run the code if the assumption is determined to be valid.

15. The medium of claim 13 further storing instructions to make a new assumption if the assumption is determined not to be valid and compile the code with the new assumption.

16. The medium of claim 15 further storing instructions to compile the code without using bounds if the new assumption is not valid.

17. The medium of claim 10 further storing instructions to simplify one or more double sided interval bounds to single sided interval bounds.

18. An apparatus comprising:
a hardware programmable culling unit; and
a compiler coupled to said programmable culling unit, said compiler to determine whether code for the programmable culling unit has at least one culling input variable with non-infinite bounds that can be calculated, if so, for each variable whose bounds can be determined, tracking the bounds through the code during compilation, make an assumption at compile time of the bounds if the bounds cannot be calculated, and track the bounds including evaluating instructions using bounded arithmetic.

19. The apparatus of claim 18 wherein said apparatus is a display adapter.

20. The apparatus of claim 18 including a controller.

21. The apparatus of claim 20 wherein said controller to reassess the assumption at run time.

22. The apparatus of claim 21, said controller to run the code if the assumption is determined to be valid.

23. The apparatus of claim 21, said compiler to make a new assumption if the assumption is determined not to be valid and to compile a code with the new assumption.

24. The apparatus of claim 23, said compiler to compile the code without using bounds if the new assumption is not valid.

25. The apparatus of claim 18, said compiler to use information about interval instructions to generate scalar instructions said interval instructions having operands spaced by intervals.

26. The apparatus of claim 25, said compiler to use interval bounds to generate scalar instructions.

* * * * *